US007770277B2

(12) United States Patent
Wridt

(10) Patent No.: US 7,770,277 B2
(45) Date of Patent: Aug. 10, 2010

(54) UNIVERSAL PULLING TOOL

(75) Inventor: Gerald A. Wridt, Racine, WI (US)

(73) Assignee: Snap-on Incorporated, Kenosha, WI (US)

(*) Notice: Subject to any disclaimer, the term of this patent is extended or adjusted under 35 U.S.C. 154(b) by 84 days.

(21) Appl. No.: 10/938,319

(22) Filed: Sep. 10, 2004

(65) Prior Publication Data

US 2006/0053609 A1 Mar. 16, 2006

(51) Int. Cl.
*B23P 19/04* (2006.01)

(52) U.S. Cl. .............................. 29/261; 29/255; 29/270

(58) Field of Classification Search ........... 29/260–265, 29/255
See application file for complete search history.

(56) References Cited

U.S. PATENT DOCUMENTS 1,123,513 A * 1/1915 Gaillard ....................... 29/261
1,436,081 A * 11/1922 Brockway .................... 29/259
1,470,310 A * 10/1923 Winchell ..................... 29/261
1,589,015 A * 6/1926 Lee ............................. 29/261
3,689,978 A 9/1972 Kelso
4,649,615 A 3/1987 Hundley
4,868,965 A 9/1989 Drymon
4,989,311 A 2/1991 Rosin
4,989,312 A 2/1991 Maddalena
5,557,833 A 9/1996 Pool
5,896,639 A * 4/1999 Chen ........................... 29/261
5,983,474 A * 11/1999 Koppe ......................... 29/261
6,012,211 A 1/2000 Ochoa et al.
6,305,061 B1 10/2001 King
6,415,491 B1 7/2002 Klann
6,665,918 B1 * 12/2003 Williams ..................... 29/259
2006/0053609 A1 * 3/2006 Wridt .......................... 29/261

* cited by examiner

*Primary Examiner*—Lee D Wilson
(74) *Attorney, Agent, or Firm*—Seyfarth Shaw LLP

(57) ABSTRACT

A pulling tool having a support member, a first surface and a second surface. The first surface including a slot positioned thereon and the second surface include a recess in communication with the slot. A ledge is formed where the recess and the slot intersect. At least one rod is disposed in the slot and recess and includes a portion engageable with the ledge.

30 Claims, 4 Drawing Sheets

UNIVERSAL PULLING TOOL

BACKGROUND

This application relates generally to pulling tools, and more particularly, to pulling tools for the removal of a component (steering wheel, hub, gear, etc.) from a shaft.

Pulling tools are often tailored to a particular brand or type of component. For example, a steering wheel mount plate typically has a particular configuration of holes or slots located thereon. One of the slots receives a shaft to which the mounting plate is attached and the other slots receive the jaws of a steering wheel puller. During a removal operation, the jaws operate against the bottom of the plate to pull the wheel off. For the puller to work, the jaw configuration must match the slot configuration of the mounting plate The slot configuration, however, is generally unique to the manufacturer of the steering wheel. Therefore, each steering wheel has its own unique puller. This is a burden for mechanics because they must keep a separate puller for each type of steering wheel. Accordingly, what is needed is a universal pulling tool.

SUMMARY OF THE INVENTION

Embodiments detailed herein describe a pulling tool. In one embodiment, the pulling tool includes a support member having a first surface and a second surface. The first surface includes at least one slot positioned thereon, and the second surface includes at least one recess in communication with the slot. A ledge is formed where the recess and the slot intersect. A rod is disposed in the slot and recess and includes a portion engageable with the ledge.

In an embodiment, a pulling tool includes a support member having at least one aperture. The aperture includes a through portion and a stop portion. The width of the stop portion is greater than the width of the through portion. A rod is disposable in the aperture and has an engagement portion that is shaped and dimensional to only fit in the stop portion.

In an embodiment, a pulling tool includes a means for engaging a work piece. The tool also includes a means for supporting the engaging means. The supporting means has a means for preventing motion of the engaging means with respect to the supporting means. A force-applying means is used to pull the work piece from a shaft.

Finally, in an embodiment, a method of manufacturing a pulling tool is described. At least one slot on a first surface of a support member is formed. At least one recess on a second surface of the support member is formed. The recess is formed in communication with the slot to create a ledge at the intersection of the recess and the slot. A rod is positioned in the recess and slot, and in engagement with the ledge.

DETAILED DESCRIPTION

Figure 1:
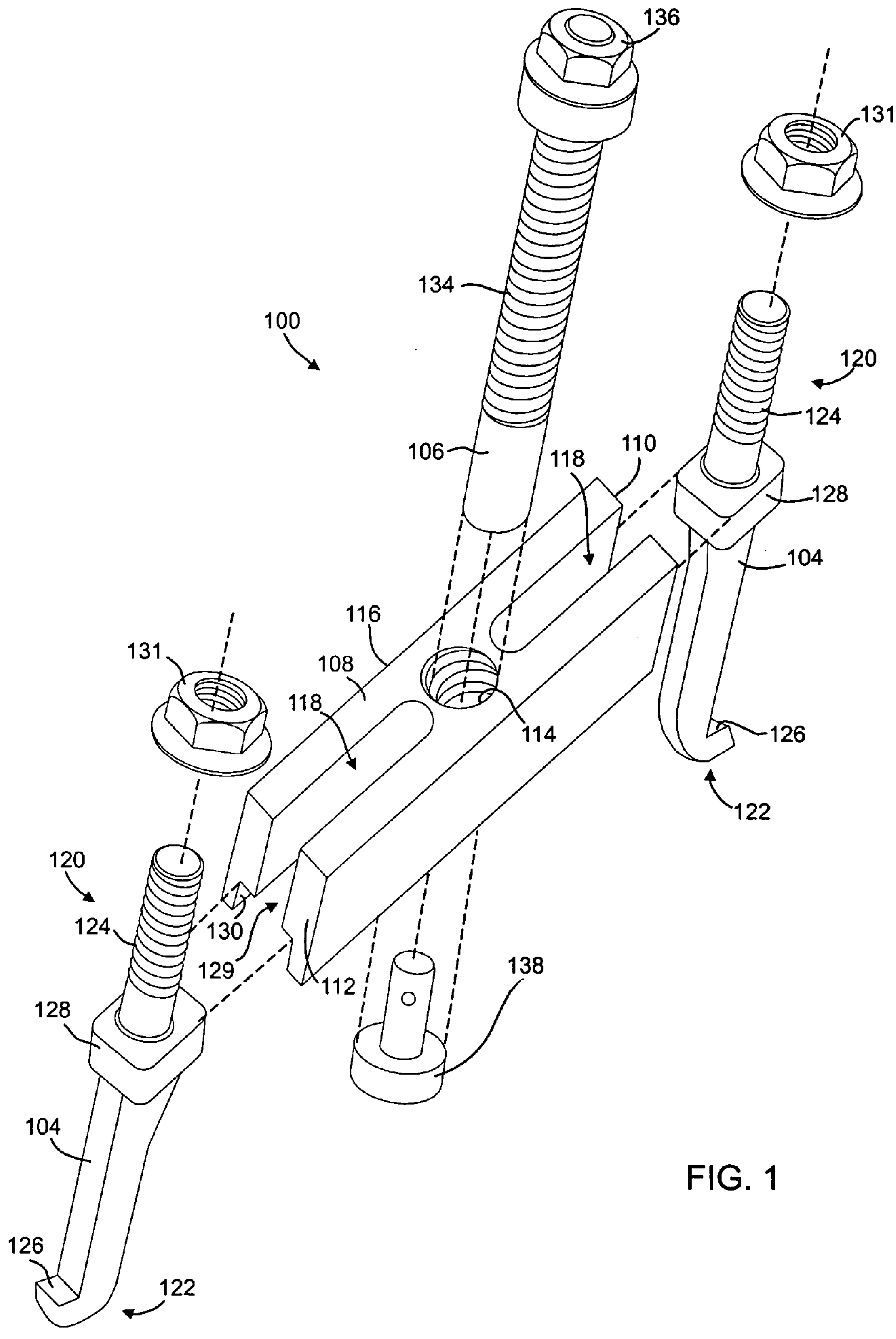
FIG. 1 is an exploded perspective view of one example of a pulling tool.
Figure 6:
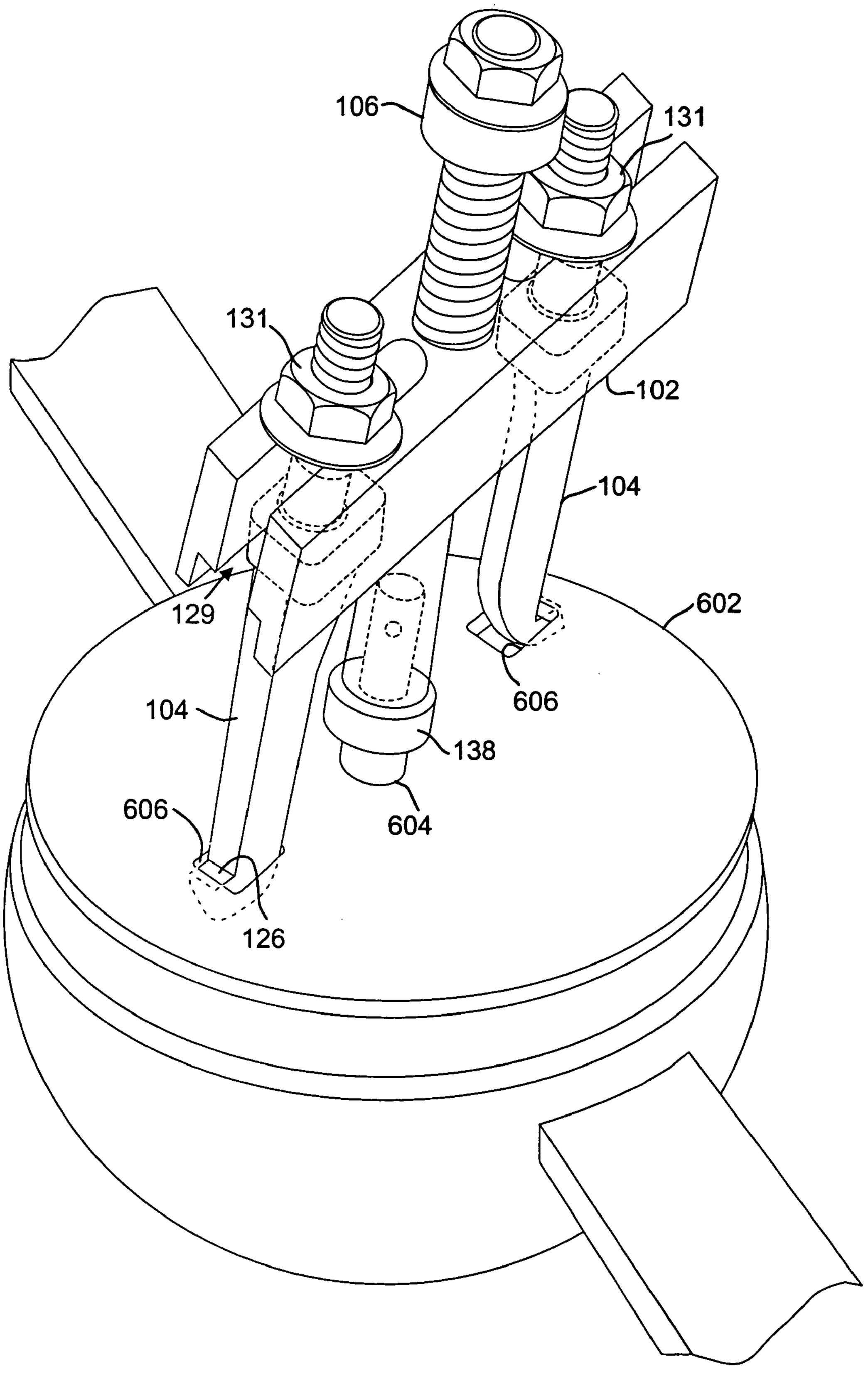
FIG. 6 is a perspective view of the universal pulling tool of FIG. 1 shown engaged with a work piece.

Referring to FIGS. 1 and 6, a pulling tool 100, in one example, comprises support member 102, rods 104 and bolt 106. Support member 102, rods 104, and bolt 106 can be made of a number of different materials (e.g., metals, stainless steel, plastic, etc) provided each is strong enough for pulling tool 100 to function for its intended purpose, such as removing a steering wheel from a shaft. Support member 102, rods 104 and bolt 106 can be made of the same material, or they can be made of a combination of materials, provided tool 100 can function for its intended purpose.

Figure 2:
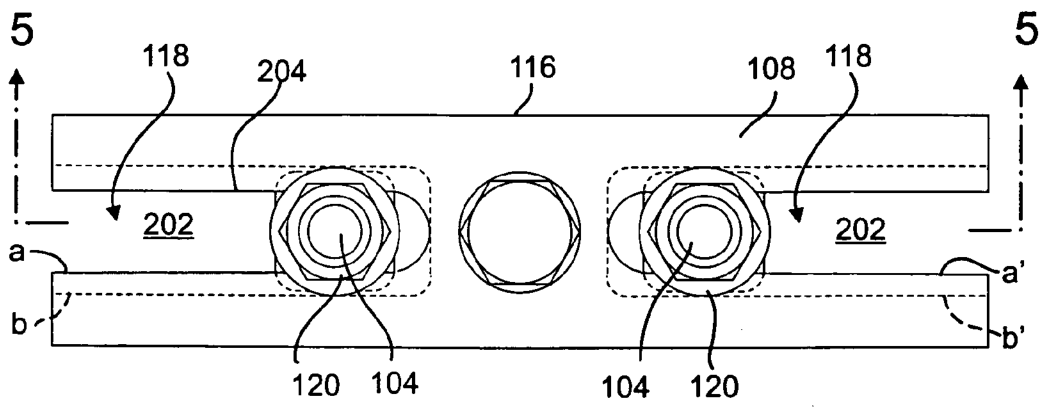
FIG. 2 is a top assembled view of the pulling tool of FIG. 1.
Figure 3:
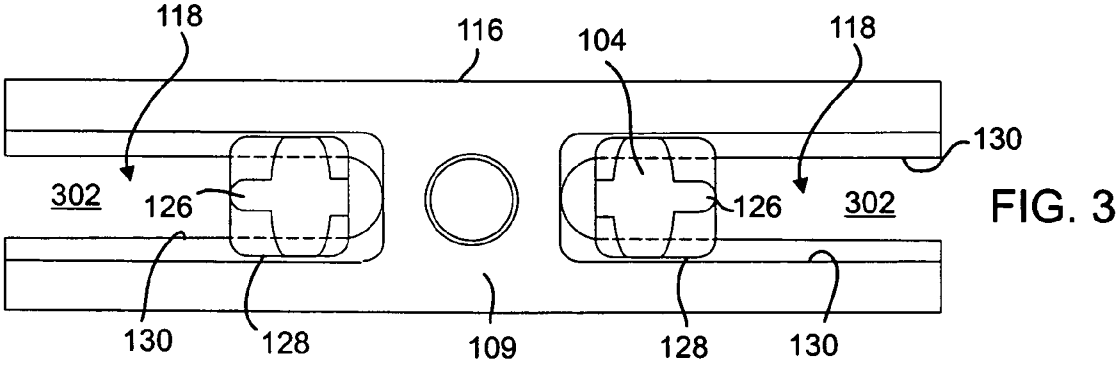
FIG. 3 is a bottom view of the pulling tool of FIG. 2.
Figure 4:
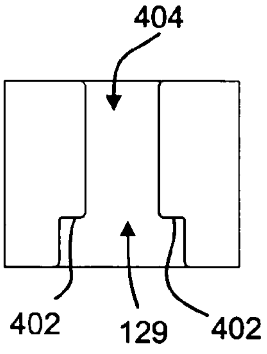
FIG. 4 is an end elevational view of a support member utilized by the pulling tool of FIG. 1.

Referring further to FIGS. 2-4, support member 102, in one example, comprises a bar of material having a top surface 108, a bottom surface 109, a first end 110, and a second end 112. A threaded opening 114 is formed through the support member 102 from surface 108 to surface 109 at a midpoint 116, between first end 110 and second end 112. Apertures 118 are positioned on each side of opening 114. Each aperture 118 extends longitudinally from a respective one of ends 110, 112 to a point just short of opening 114.

Rods 104 are disposable in the apertures 118. Each rod 104 has a first end 120 and a second end 122. First end 120 includes threaded portion 124. Second end 122 includes hook portion 126. A boss 128 is located between first end 120 and second end 122. Boss 128 fits within a stop portion 129 of each aperture 118. Sidewalls 130 define stop portion 129 and prevent boss 128 from rotating when pulling tool 100 is in use.

In FIG. 1, boss 128 is substantially rectangular in shape, and stop portion 129 is rectangular in cross section. Boss 128 and stop portion 129 can have other shapes, provided boss 128 fits within stop portion 129, and sidewalls 130 prevent boss 128 from rotating. For example, boss 128 could be hexagonal and stop portion 129 could be rectangular. The design considerations regarding the shape of boss 128 will be further discussed herein.

Rods 104 are disposed within apertures 118 and secured to support member 102 by flanged nuts 131, which fasten each rod 104 in a desired longitudinal position within its corresponding aperture 118. Nuts 131 also prevent downward movement of rods 104 when tool 100 is in use.

Bolt 106 is positioned within opening 114. In one example, bolt 106 includes threaded portion 134, head portion 136 and tip portion 138. Threaded portion 134 engages with the threads located in hole 114. If necessary, head portion 136 is engageable with a wrench or screwdriver to aid in the rotation of bolt 106. Tip portion 138 operates against a shaft to which a wheel, hub, gear, and the like is attached. Tip portion 138, in one example, is removable from bolt 106. Alternatively, tip portion 138 could be integral with bolt 106.

Referring now to FIGS. 2 and 3, each aperture 118 is formed by a slot 202 positioned on top surface 108 (FIG. 2) of support member 102, and a recess 302 positioned on the bottom surface 109 (FIG. 3) of support member 102. Slots 202 and recesses 302 are in communication with each other. Slots 202 are positioned on each side of hole 114 and are outlined by lines a and a'. Recesses 302 are positioned on each side of hole 114 and are outlined by lines b and b'. Each slot 202 is in registration with a corresponding recess 302 and both extend longitudinally along top surface 108 and bottom surface 303, respectively.

Referring still to FIGS. 2 and 3, each slot 202 is shown as including a rectangular portion 204 and an arcuate end portion, whereas each recess 302 is shown as substantially rectangular. This configuration is presented for illustrative purposes only. Slots 202 and recesses 302 could have different lengths. By registering slots each have 202 and recesses 302, however, a user can longitudinally adjust rods 104 along the length of support member 102. Slots 202 can also have a different shape, provided upper end 120 of each rod 104 can move longitudinally throughout aperture 118.

Similarly, recesses 302 can have a different shape. The shape of recesses 302 serves multiple purposes though. First, boss 128 engages with walls 130 to prevent rotational movement of each rod 104, but to permit movement longitudinally of the support member 102. Second, the shape of boss 128 and the shape of recess 302 determine the number of rotational positions that hook 126 can occupy. For example, a square shaped boss 128 and a rectangular recess provide hook 126 with four settings: 0°, 90°, 180°, and 270°. A hexagonal boss 128 and a rectangular recess 302 provide hook 126 with six settings: 0°, 60°, 120°, 180°, 240° and 300°. The multiple settings and the longitudinal adjustment of rods 104 make pulling tool 100 employable with work pieces of many different shapes, sizes, and configurations.

Now referring to FIGS. 1 and 4, ledges 402 are formed where slots 202 and recesses 302 intersect. Ledges 402 divide aperture 118 into through portion 404 and stop portion 129. Because boss 128 is shaped and dimensioned to only fit within the stop portion 129, boss 128 cannot fit within through portion 404. Accordingly, when rods 104 are disposed within apertures 118, boss 128 engages with ledge 402, and ledge 402 prevents upward movement of rod 104. Similarly, sidewalls 130 prevent rotational movement of rods 104.

Figure 5:
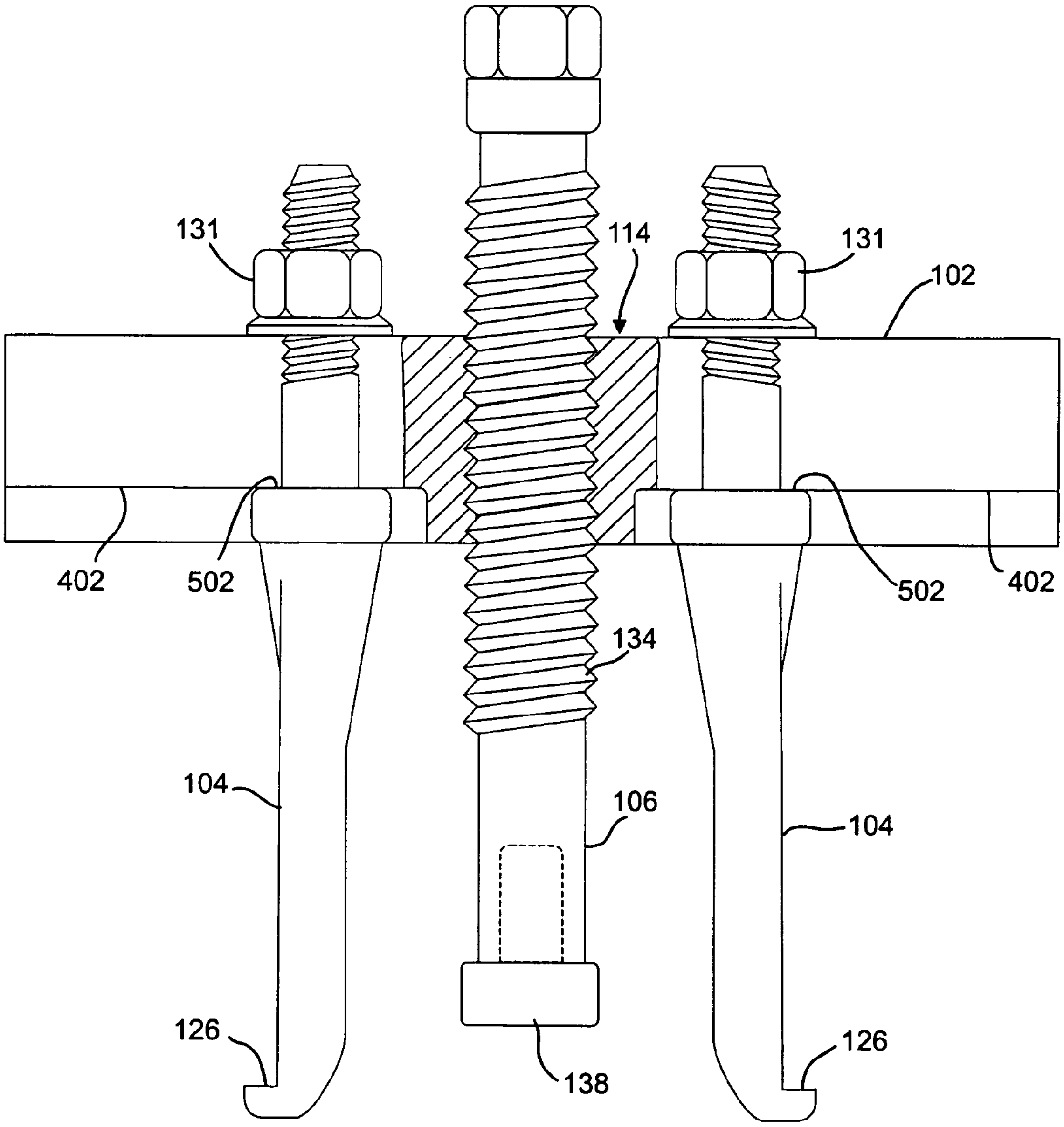
FIG. 5 is an enlarged sectional view taken along line 5-5 of FIG. 2.

Referring to FIG. 5, rods 104 are held in position, on support member 102, through flanged nuts 131, drawing each rod 104 upward, and the top side 502 of boss 128 engaging ledge 402, which resists the upward pull of flanged nuts 131.

Referring to FIGS. 5 and 6, to use pulling tool 100, hook portions 126 are positioned against an under surface of a work piece 602. Tip portion 138 of bolt 106 is positioned against a shaft 604 to which the work piece 602 is mounted. When bolt 106 is turned clockwise threaded portion 134 engages the threads within opening 114. Bolt 106 then exerts downward force against shaft 604, but because shaft 604 resists the force of bolt 106, support member 102 is urged upward. Accordingly, support member 102 pulls rods 104 upward. Hook portions 126 engage the underside of plate 602 and thereby pull plate 602 upwardly along shaft 604.

Referring to FIG. 6, to position pulling tool 100 a user first inserts hook portion 126 of each rod 104 in slots 606. Depending on the slot configuration, the user may have to adjust rods 104 longitudinally with respect to support member 102. The user may also have to rotate each rod 104 in order for hook portion 126 to engage an under surface of plate 602. Once rods 104 are set, the user seats bosses 128 within stop portions 129 and tightens flanged nuts 131. Bolt 106 is rotated such that tip portion 138 is in contact with shaft 104. The user continues to rotate bolt 106 thereby drawing support member 102 upward engaging hook portions 126 with the underside of plate 602, and pulling plate 602 off shaft 604.

As another alternative, which is not shown in the drawings, pulling tool 100 can be employed with flanged nuts 131 omitted. In this example, support member 102 is inverted such that recess 302 is located above slot 202. In this example, ledge 402 prevents downward motion of rods 104 and the upward motion of rods 104 is prevented by the biasing action of plate 602 on hook portions 126. The remainder of the operation of pulling tool 100 is the same as described in the previous example.

The matter set forth in the foregoing description and accompanying drawings is offered by way of illustration only and not as a limitation. While particular embodiments have been shown and described, it would be apparent to those skilled in the art that changes and modifications may be made without departing from the broader aspects of applicant's contribution. The actual scope of the protection sought is intended to be defined in the following claims, when viewed in their proper perspective based on the prior art.

What is claimed is:

1. In a pulling tool, the combination comprising:
- a support member having a first surface and a second surface, the first surface including at least one slot positioned therein and the second surface including at least one recess in communication with the slot such that a ledge is formed where the recess and the slot intersect;
- at least one rod having an upper end disposed in the slot and a lower end disposed the recess and including a portion engageable with the ledge;
- a fastener engageable with the upper end of said rod and said support member to lock said rod in position vertically and laterally relative to said support member; and
- wherein said at least one slot has said at least one recess with said ledge being wider than said slot.

2. The combination of claim 1, wherein the support member has two opposing sides of a predetermined length, the slot extends longitudinally along at least a portion of the length on the first surface and the recess extends longitudinally along a portion of the length on the second surface.

3. The combination of claim 2, wherein the support member includes a first end and a second end, and the at least one slot and at least one recess comprise:
- a first slot in communication with a corresponding first recess to form a first ledge, each of the first slot and first recess extending from the first end of the support member to a location between the first end and a midpoint of the support member; and
- a second slot in communication with a corresponding second recess to form a second ledge, each of the second slot and second recess extending from the second end of the support member to a location between the second end and the midpoint.

4. The combination of claim 3, wherein the support member is generally "H" shaped.

5. The combination of claim 3, wherein the at least one rod comprises:
- a first rod disposed in the first recess and the first slot and engaged with the first ledge; and
- a second rod disposed in the second slot and second recess and engaged with the second ledge.

6. The combination of claim 1, wherein the at least one rod includes a first end and a second end, the first end extending from the first surface of the support member, and the second end extending from the second surface of the support member, wherein the second end includes a hook integral therewith.

7. The combination of claim 6, further comprising:
- a fastener attached to the first end to prevent the rod from moving in a direction away from the second surface of the support member.

8. The combination of claim 6, wherein the rod includes a boss positioned between the first end and the second end of the rod, the boss being positioned within the recess such that the boss engages with the ledge to prevent movement of the rod in a direction away from the first surface of the support member.

9. The combination of claim 1, wherein the support member has two opposing sides of a predetermined length, the slot extending from an end of said support member longitudinally along at least a portion of the length on the first surface and the recess extending longitudinally along a portion of the length on the second surface from said end.

10. A method of manufacturing a pulling tool, comprising:

forming at least two slots on a first surface of a support member wherein said slots each have a lower rectangular portion being wider than said slot, forming at least two recesses on a second surface of the support member, the recesses being formed in communication with the slots to create ledges at the intersection of the recesses and slots;

forming an opening between said slots, said opening extending through said first surface and said second surface; and positioning a rod in each of the recesses and slots in respective engagement with the ledges, each of said rods having an upper end and a lower end and being adjustable vertically and laterally; and connecting a fastener to the upper end of at least one of said rods and said support member to lock said rod in position vertically and laterally relative to said support member;

connecting a bolt to said opening.

11. The method of claim 10, wherein the step of forming the slots comprises respectively extending the slots longitudinally along at least a portion of a length of the first surface, and forming the recesses comprises respectively extending the recesses longitudinally along a portion of a length of the second surface.

12. The method of claim 11, wherein the step of forming the slots comprises:

forming a first slot extending from a first end of the support member to a point between the first end and a midpoint between the first end and a second end of the support member, and forming a second slot extending from a second end of the support member to a point between the second end and the midpoint.

13. The method of claim 12, wherein the step of forming the recesses comprises:

forming a first recess, in communication with the first slot to form a first ledge, the first recess extending from the first edge to a point between the first end and the midpoint, and forming a second recess, in communication with the second slot to form a second edge, the second recess extending from the second end to a point between the second end and the midpoint.

14. The method of claim 13, wherein the step of positioning at least one rod comprises:

positioning a first rod in the first slot and first recess and in engagement with the first ledge, and positioning a second rod in the second slot and second recess and in engagement with the second ledge.

15. The method of claim 12, further comprising:

positioning a threaded opening at the midpoint; and threadedly engaging a bolt in the opening.

16. The method of claim 11, further comprising: engaging a boss, located between a first end and a second end of each rod, with the ledge.

17. The method of claim 10, wherein the step of forming the slots comprises respectively extending the slots from opposing ends of said support member longitudinally along at least a portion of a length of the first surface, and forming the recesses comprises respectively extending the recesses from said opposing ends longitudinally along a portion of a length of the second surface.

18. A pulling tool, comprising:

a support member including at least two apertures each having a through portion and a stop portion, with a width of the stop portion being greater than a width of the through portion, at least one rod disposable in each of the apertures and having an upper portion and an engagement portion that is shaped and dimensioned to only fit in the stop portion of the aperture, each of said rods being adjustable vertically and laterally;

a fastener connected to the upper portion of at least one of said rods and said support member to lock said rod in position vertically and laterally relative to said support member, a threaded opening located at a midpoint between the first half and the second half of the support member; and a bolt threadably engaged in the opening.

19. The pulling tool of claim 18, wherein the support member has two opposing sides of a predetermined length, the through portion comprises a slot extending longitudinally over a first surface of the support member, and the stop portion comprises a recess extending longitudinally over a second surface of the support member.

20. The pulling tool of claim 18, wherein each rod comprises a first end and a second end, and the engagement portion of each rod comprises a square boss located between the first end and the second end.

21. The pulling tool of claim 20, further comprising:

a hook located formed integrally with the second end of at least one of the rods.

22. The pulling tool of claim 18, wherein the support member comprises a metal bar.

23. The pulling tool of claim 18, wherein the at least one aperture includes a first aperture located on a first half of the support member and a second aperture located on a second half of the support member.

24. The pulling tool of claim 18, wherein the support member has two opposing sides of a predetermined length, the through portion comprises a slot extending from an end of said support member longitudinally over a first surface of the support member, and the stop portion comprises a recess extending from said end longitudinally over a second surface of the support member.

25. In a pulling tool, the combination comprising:

a support member having a first surface and a second surface, the first surface including at least one slot positioned therein and the second surface including at least one recess in communication with the slot such that a ledge is formed where the recess and the slot intersect; and at least one rod disposed in the slot and the recess and including a portion engageable with the ledge, wherein the support member has two opposing sides of a predetermined length, the slot extends longitudinally along at least a portion of the length on the first surface and the recess extends longitudinally along a portion of the length on the second surface, the recess located below and extends parallel to the slot, wherein the recess is rectangular, wherein the slot includes a rectangular portion, and an arcuate portion, the arcuate portion located at an end of the slot.

26. The pulling tool of claim 25, wherein the slot and the recess are in registration such that the rod can be moved longitudinally along at least a portion of the support member.

27. A method of manufacturing a pulling tool, comprising:

forming at least one slot on a first surface of a support member, wherein the slot extends longitudinally along at least a portion of a length of the first surface, forming at least one rectangular recess on a second surface of the support member, the recess extending longitudinally along a portion of a length of the second surface and being formed in communication with the slot to create a ledge at the intersection of the recess and the slot, the recess being located below and extending parallel to the slot; and positioning a rod in the recess and the slot and in engagement with the ledge, wherein the step of forming the slot comprises forming the slot to include a rectangular portion and an arcuate portion, the arcuate portion located at an end of the slot.

28. The method of claim 27, further comprising:

positioning the slot and the recess in registration such that the rod can be moved longitudinally along at least a portion of the support member.

29. A pulling tool, comprising:

a support member including two opposing sides of a predetermined length and at least two apertures, each aperture having a through portion and a stop portion, with a width of the stop portion being greater than a width of the through portion, the through portion including a slot extending longitudinally over a first surface of the support member, and the stop portion including a recess extending longitudinally over a second surface of the support member, the slot including a rectangular portion and an arcuate portion;

at least one rod disposable in each of the apertures and having an engagement portion that is shaped and dimensioned to only fit in the stop portion of the aperture, each of said rods being adjustable vertically and laterally;

a fastener connected to at least one of said rods and said support member to lock said rod in position, a threaded opening located at a midpoint between the first half and the second half of the support member; and a bolt threadably engaged in the opening.

30. The pulling tool of claim 29, wherein the recess is rectangular.

* * * * *